INVENTOR.
BORGE R. REIMER

Aug. 2, 1966  B. R. REIMER  3,263,451

TORQUE OVERLOAD CONTROL DEVICE

Filed March 23, 1964  7 Sheets-Sheet 4

INVENTOR.
BORGE R. REIMER

BY Walter E. Pavlick
Harold D. Hall

ATTORNEYS

Aug. 2, 1966  B. R. REIMER  3,263,451
TORQUE OVERLOAD CONTROL DEVICE
Filed March 23, 1964  7 Sheets-Sheet 5

INVENTOR.
BORGE R. REIMER
BY Walter E. Pavlick
Harold D. Shall
ATTORNEYS

INVENTOR.
BORGE R. REIMER

Aug. 2, 1966  B. R. REIMER  3,263,451
TORQUE OVERLOAD CONTROL DEVICE
Filed March 23, 1964  7 Sheets-Sheet 7

INVENTOR.
BORGE R. REIMER
BY Walter E. Pavlick
Harold D. Stall
ATTORNEYS

United States Patent Office 3,263,451
Patented August 2, 1966

3,263,451
TORQUE OVERLOAD CONTROL DEVICE
Borge R. Reimer, St. Catharines, Ontario, Canada, assignor to Hayes Steel Products Limited, Thorold, Ontario, Canada, a corporation of Canada
Filed Mar. 23, 1964, Ser. No. 353,888
17 Claims. (Cl. 64—29)

This invention relates to torque overload control devices in general and is more specifically directed to the type of device wherein a pair of members are drivingly connected in a torque transferring relationship by an intermediate means and the latter is operative to become disengaged upon the attainment of a preselected torque level.

Most prior art devices of this nature incorporate an intermediate means which is gradually withdrawn from its connecting relationship with the drive and driven members as the torque level is increased, until the final predetermined load is reached, at which time complete withdrawal is attained. This type of device, because of the gradual withdrawal, is difficult to control. Further, in this type of device, such as shown in United States Patent No. 2,983,121, either the driving member or the driven member is biased toward the other member and the intermediate means in the form of torque transferring elements is compressed therebetween in cam slots so that not only are the torque elements subjected to the torque loads, but they are also subjected to the biasing compressive load of the members. Additionally, just prior to complete withdrawal, only a small portion of the torque transferring elements are engaging the members so that the unit loads thereon are greatly increased not only by the smaller contact area but also by the increased torque level and the increased biasing level, and after disengagement, the full biasing load remains on the torque transferring elements. There is also a tendency to maintain the torque overload in the driven member as long as the driving member continues its driving movement, as there is no provision for the driven member to regress from its torsional state under this condition.

It is, therefore, an object of this invention to provide a torque overload control device wherein full driving contact is maintained between the elements thereof until the torque limit is reached, at which time the driving relationship between the driving and driven members is positively and instantaneously terminated.

It is also an object of this invention to provide such a device wherein the torsional stress in the driven member may regress even though the driving member continues its driving movement.

It is another object of this invention to provide such a device wherein the means which connect the driving and driven members is not simultaneously subjected to maximum torque loading and a separate maximum biasing load which has to be overcome to effect disconnection.

Yet another object of this invention is to provide such a device wherein the drive and driven members are connected by a coupling means including a torsionally acting resilient means so that torsional vibrations therebetween are dampened and that resilient relative torsional deflection can occur therebetween.

It is yet another object of this invention to provide a device including drive and driven members coupled together by means of a resilient coupling means including a clutch; the coupling means being operative to torsionally deflect to allow deflection to occur between the members until a predetermined torque load is attained at which time the resilient coupling device is positively uncoupled. It is also contemplated that the coupling device includes a lost motion connection so that at least a portion of the torsional stress in the coupling device may be dissipated in the uncoupled condition.

Further and other objects of this invention will become apparent upon a consideration of the detailed specification when taken in conjunction with the following drawings wherein.

Figure 1:
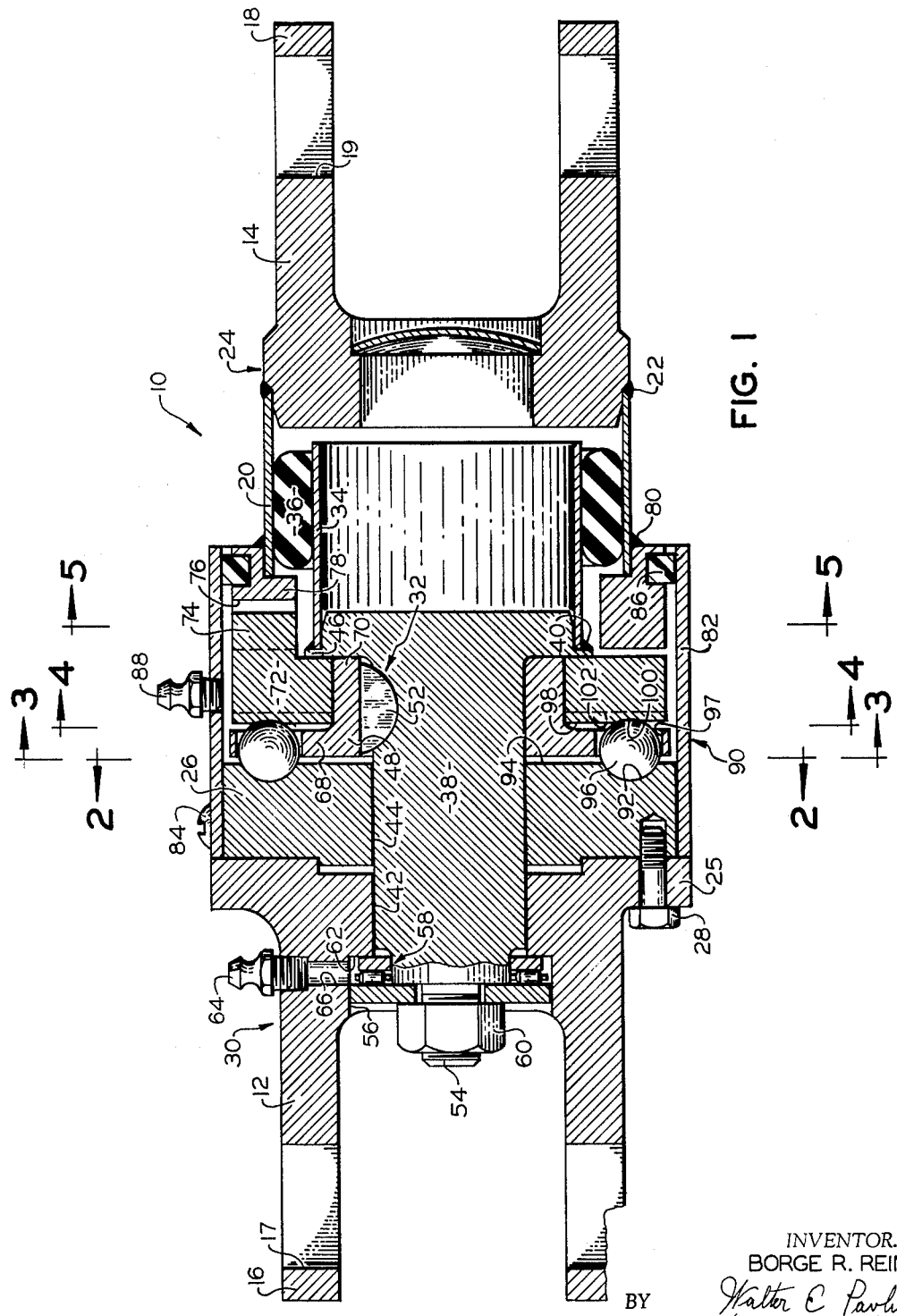
FIG. 1 is a longitudinal sectional view of a device embodying this invention.

In the preferred embodiment of this invention, drive and driven members are operative to be drivingly connected by a coupling device. The coupling device includes a clutch means, a resilient element, and a clutch disengaging means. The resilient element is disposed so as to be torsionally deflected as torque is transferred between the drive and driven members so that the members are resiliently coupled; the resilient means being serially disposed between the clutch means and one of the members so that the deflection takes place therebetween.

With the clutch means engaged, the clutch disengaging means is connected to one of the members by a first lost motion connection so that relative movement may take place therebetween during the predetermined torsional deflection of the resilient element and relative movement between the members, until the first lost motion connection is fully utilized at which time the clutch disengaging means disengages the clutch and the resilient element becomes operatively connected to the clutch disengaging element and the member between which and the clutch means the resilient element was connected. The clutch disengaging means is also connected to the latter member by a second lost motion connection so that said resilient means may torsionally partially unwind while the clutch disengaging means moves relative to said latter member; said first and second lost motion connections being operative upon opposite directions of movement of the clutch disengaging means. At this time, a residual stress remains in the resilient element which is lower than the stress contained therein at the controlled torque level. When the torsional driving loads of the driving member falls below the level of residual torsional stress remaining in the resilient element the latter urges the clutch means to return to clutch engagement accompanied by a release of the resilient element from the clutch disengaging means.

Referring to the embodiment of this invention shown in FIGS. 1–5, a drive line shown generally at 10 includes a pair of opposed yoke members 12 and 14 having opposed lugs 16 and 18 respectively, which lugs are disposed in an inphase, aligned relationship. Either the yoke 12 or the yoke 14 may be the driving end of the drive line 10 and the other is the driven end; however, for the purpose of description, the yoke 12 will be considered the driving end and the yoke 14 the driven end. The lugs 16 and 18 are provided with suitable openings 17 and 19 respectively so that the drive line 10 may be connected in a driving relationship with other torque transferring mechanisms (not shown).

The yoke 14 has an annular member in the form of a tubular shaft 20 secured thereto, as by a weld shown at 22 so that the shaft 20 and the yoke 14 constitute a portion of the driven member 24. The yoke 12 is formed with an annular flange 25, and an annular drive plate 26 is secured in a concentric relationship to the right side of the flange 25 by a plurality of bolts 28 so that the yoke 12 and a portion of the plate 26 constitute the driving member 30.

Means shown generally at 32 are provided to drivingly couple the drive and driven members 30 and 24. More particularly, the coupling means 32 includes a tubular shaft 34 disposed concentrically with the shaft 20. The shaft 34 is spaced radially inwardly from the shaft 20 and a torsionally acting resilient means in the form of an annular resilient elastomeric element 36 is disposed therebetween and suitably secured to both of the shafts; the preferred manner of securement being bonding the element 36 to the inner shaft 34 and compressively surrounding the element with the outer shaft 20. It is understood that for the purpose of this invention many other types of torsionally acting resilient means can be utilized in the coupling means 32.

A stub shaft 38 is pressed into the left end of the shaft 34 and suitably secured thereto as by a weld 40. The stub shaft 38 extends to the left and is rotatably received in central bores 42 and 44 and the yoke 12 and drive plate 26 respectively. An abutting shoulder 46 is formed on the shaft 38 to the left of the weld 40, and an annular retainer member 48 is pressed on the stub shaft and disposed between the drive plate 26 and the shoulder 46; the retainer member being secured to the stub shaft 38 for unitary movement by means of a key 52. A threaded end 54 of the stub shaft 38 extends from a counterbore 56 in the yoke 12, and a thrust washer and bearing assembly 58 is secured to the end of the stub shaft by a nut 60 which engages the left side of the assembly 58 while the right side of the assembly engages a shoulder 62 which terminates the bore 56. Accordingly, the yoke 12 and drive plate 26 are freely rotatable on the stub shaft 38 and thrust loads to the left of the yoke 12 relative to the stub shaft are resisted by the assembly 58. A lubricant nipple 64 is threaded into an opening 66, which is confluent with the counterbore 56, so that lubricant may be injected thereinto to assure the free relative rotation.

The retainer member 48 is formed with an annular flange portion 68 which extends radially from an axially elongated hub portion 70, the flange portion being disposed juxtaposed the drive plate 26, while a floating cam member 72 is rotatably disposed on the hub 70 and positioned between and slightly axially spaced from the flange 68 and the shoulder 46 of the stub shaft 38. The floating cam member 72 includes a lug portion 74 which extends axially to the right therefrom into a circumferentially elongated slot 76 formed in a cam stop member 78. The cam stop member 78 is formed annularly and is disposed about and radially spaced from the inner shaft 34 while being secured for unitary movement to the outer shaft 20 by a weld 80, so that the cam stop 78 also forms a portion of the driven member 24.

A cover sleeve 82 is secured to the periphery of the drive plate 26 by a plurality of screws 84, and overlies the cam stop 78 with an anti-friction sealing ring 86 disposed between the cam stop and the sleeve. A lubricant nipple 88 is secured to and extends through the sleeve 82 so that lubricant may be injected thereinto for lubricating the various portions of the coupling means 32 surrounded by the sleeve.

From the preceding description, it is apparent that the driving member 30, while mounted on the coupling means 32, is freely rotatable relative thereto and to the driven member 24. Accordingly, the coupling means 32 includes a clutch means 90 for clutching the driving member 30 thereto for unitary rotation and in a driving relationship with the driven member 24; the coupling means 32 being disposed in a serial relationship with the resilient element 36 and with the resilient element operatively connecting the clutch means with the driven member.

Figure 2:
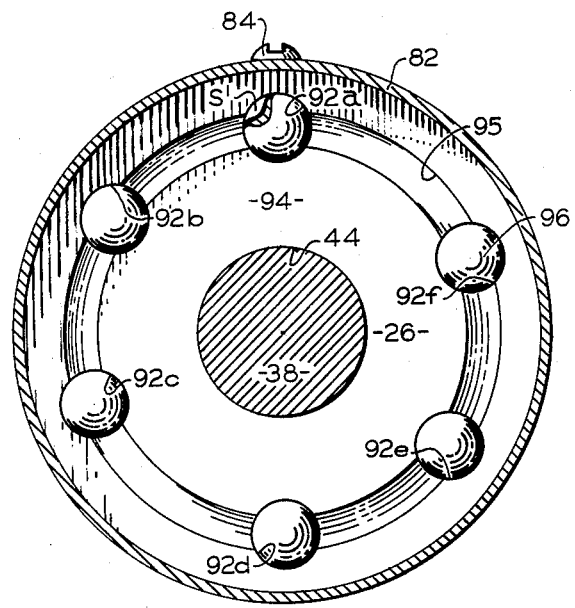
FIGS. 2–5 are views of the device shown in FIG. 1 taken along the lines 2—2, 3—3, 4—4 and 5—5 respectively.

The clutch means 90 includes a plurality of spherical camming and engaging openings 92 formed in the right face 94 of the drive plate 26. Referring to FIG. 2, starting from the 12 o'clock position and proceeding counterclockwise, the 12 o'clock opening is referred to by the numeral 92a, the next opening 92b is displaced 55 degrees therefrom, the next opening 92c is displaced 55 degrees from the opening 92b, the 6 o'clock opening is designated by the numeral 92d and is displaced 70 degrees from the opening 92c, the next opening 92e is displaced 55 degrees from the opening 92d, while the last opening 92f is displaced 55 degrees from the opening 92e and 70 degrees from the opening 92a. The exact degree of angular spacing of the openings may be varied; however, for a purpose hereinafter explained, it is desirable to have four openings spaced at equal first increments and two other openings spaced at equal second increments that are different from the first increments. The openings 92 are each connected by a circumferential groove 95 formed in the face 94, so that when the balls are displaced circumferentially from the openings 92 they are operable to roll circumferentially within the grooves 95.

Figure 3:
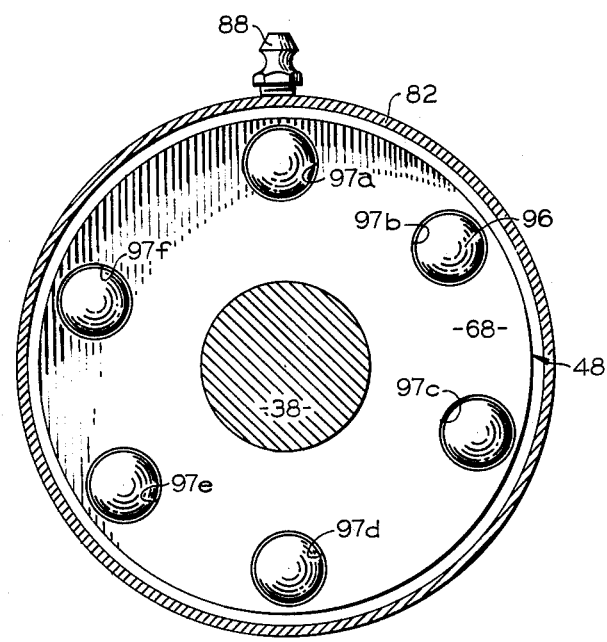

The retainer 48 also has a portion thereof which forms a part of the clutch means 90. The flange portion 68 has a plurality of openings 97 which extend axially therethrough, an opening 97 being adapted to be disposed in cooperative relationship with each of the openings 92, so that, as seen in FIG. 3, the spaces between the openings 97a, 97b, 97c, 97d, 97e, and 97f corresponding to the spacings between the openings 92a, 92b, 92c, 92d, 92e and 92f of the drive plate 26 respectively. In the operative position shown in FIG. 1, all the openings 92 and 97 are in alignment.

Disposed in each opening 92 in the drive plate 26 and the cooperating aligned opening 97 in the retainer 48 is a torque transferring and engaging element in the form of a ball 96; a portion of each ball 96 extending slightly to the right of the retainer 48. The left face 98 of the floating cam 72 is provided with a circumferentially extending groove 100 in which the extending portion of the balls 96 is received, in the operative position shown in FIG. 1, so that the face 98 is operative as a ball engaging and positioning surface and forms a part of the clutch means 90.

Figure 4:
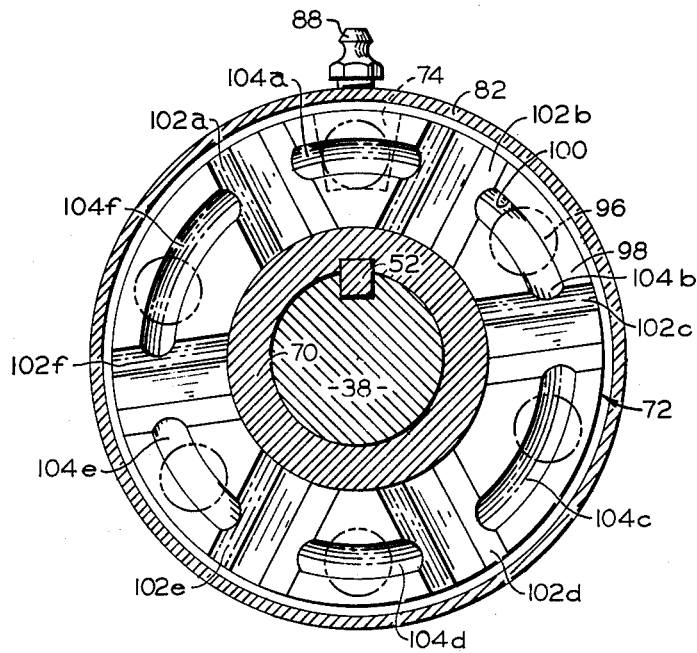

Referring to FIG. 4, the face 98 of the floating cam 72 is provided with a plurality of ball receiving cam slots 102a, 102b, 102c, 102d, 102e and 102f, which, when looking at the drive line 10 from the left end thereof, upon counterclockwise rotation of the retainer 48 relative to the floating cam 72, are alignable with the openings 97a, 97b, 97c, 97d, 97e and 97f respectively. Accordingly, the groove 100 is segmented into six portions 104a, 104b, 104c, 104d, 104e and 104f; the portions 104f and 104c being equivalent in size to the space between the openings 97a and 97f, and the openings 97c and 97d respectively, and the portions 104a, 104b, 104d and 104e being equivalent in size to the space between the openings 97a and 97b, the openings 97b and 97c, the openings 97d and 97e, and the openings 97e and 97f respectively. The balls 96, when in the opposite position shown in FIG. 1, are disposed substantially as shown in FIG. 4; one ball 96 substantially in the center of each portion 104a, 104b, 104d and 104e, and one ball positioned counterclockwise beyond the center of the portions 104c and 104f so that the balls 96 are all equidistant from the adjoining cam slot 104a through 104f.

Figure 5:
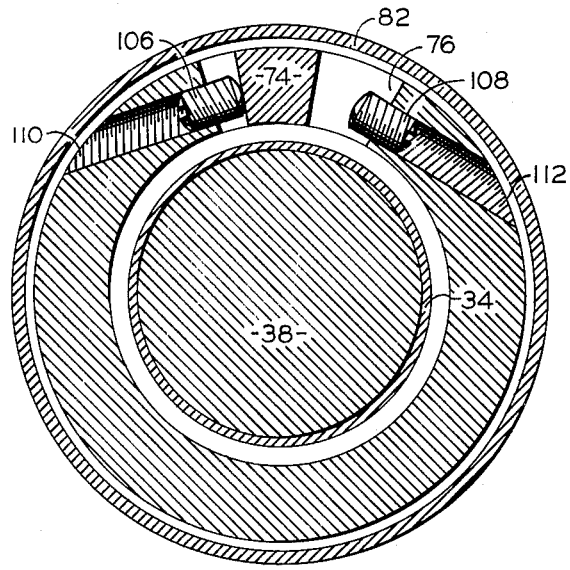

Referring to FIG. 5, the lug portion 74 of the floating cam 72 is disposed in the circumferentially elongated slot 76 in the cam stop member 78, and the effective or operative circumferential width of the slot 76 is controlled by a pair of set screws 106 and 108 threadedly positioned in a pair of chordal openings 110 and 112 respectively which are formed in the cam stop and open into the slot 76. In the operative position of FIG. 1, the lug 74 is disposed against the screw 106 and is operative to be displaced clockwise in a lost motion relationship relative to the cam stop 78 until it abuts the screw 108.

Operation

Figure 6:
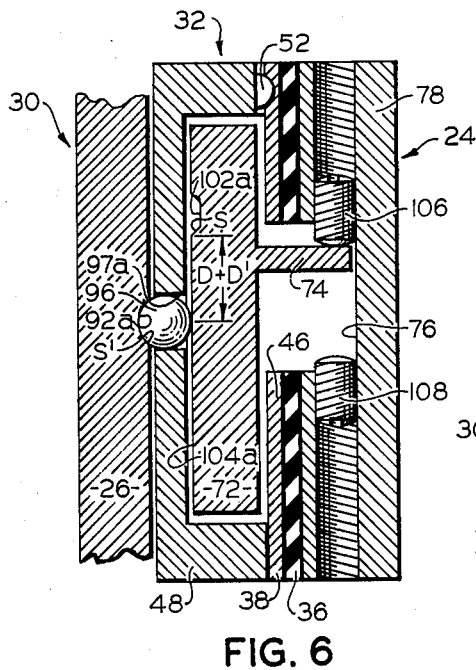
FIGS. 6–8 are diagrammatic views in the nature of a development showing the operation of the device shown in FIG. 1.
Figure 7:
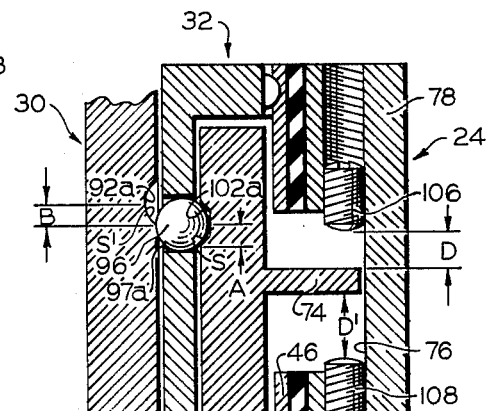
Figure 8:
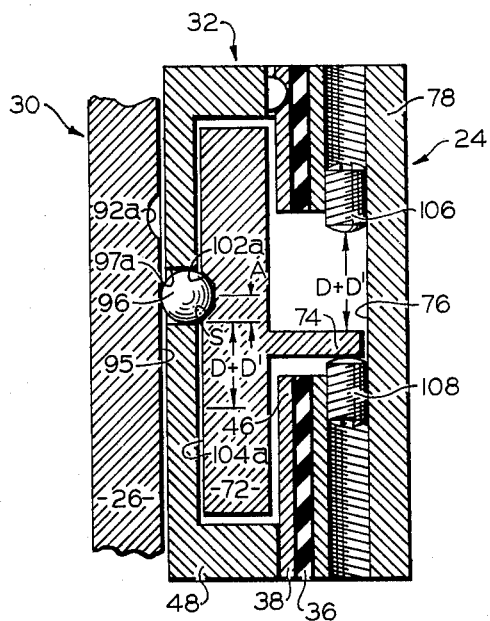

Referring to FIGS. 6–8, wherein is shown a diagrammatic representation in the nature of a development of the drive and driven members 30 and 24 and the coupling means 32 and representing one manner of operating the same and with the operation of one drive ball 96 being considered, proceeding from right to left, we see a portion of the driven member 24 in the form of the cam stop 78 with its slot 76 and set screws 106 and 108, next, the resilient element 36 with its right side secured to the cam stop 78 and its left side secured to the stub shaft 38 while the abutting shoulder 46 of the stub shaft is disposed on the right side of the floating cam 72. To the left side of the floating cam is disposed the retainer 48 which is keyed to the stub shaft 38 at the key 52, while to the far left is the drive plate 26, the right face of which is a portion of the clutch means 90 while the balance thereof is a portion of the driving member 30.

In FIG. 6, which represents operation of the drive line 10 at substantially no torque load, the ball 96 is disposed in the spherical opening 92a in the drive plate 26 and in the opening 97a in the retainer 48 and is in engagement with the engaging and positioning portion 104a of the floating cam 72.

With torque being transferred by the drive plate 26 in a counterclockwise direction as viewed from the left and picturing the cam stop 78 as being held stationary, the drive plate 26 transmits torque to the retainer 48 through the drive ball 96, while the retainer transmits torque to the stub shaft 38 and these members move unitarily. The stub shaft 38 transmits torque to the driven member 24, which is represented by the cam stop 78, through the resilient element 36. As torque load is increased, the resilient element 36 is progressively torsionally strained and the drive plate 26, retainer 48, and ball 96 move counterclockwise relative to the cam stop 78 and the floating cam 72, the latter being held stationary with the cam stop by the engagement of the lug 74 and the set screw 106. During this relative movement, the ball 96 moves along the positioning portion 104a of the floating cam 72 in a lost motion relationship so that the latter retains the ball 96 in the opening 92a; the spherical opening 92a being formed so as to induce only a slight axial force on the ball 96 and on the floating cam 72.

Upon the ball 96 reaching the cam slot 102a, as shown in FIG. 7, the ball, which at this time has been in full driving contact, is instantly cammed into the cam slot 102a by the retarding action of the retainer 48 and the component of force generated thereby against the spherical opening 92a; the retarding action of the retainer is a result of the reaction stress of the resilient element 36 upon the retainer. The floating cam is urged clockwise a first angular increment indicated at A as the ball 96 moves down the cam shoulder S of the cam slot 102a. This movement of the floating cam 72 moves the lug 74 a first angular increment clockwise relative to the screw 106 and the cam stop 78 and relative to the retainer 48 and drive plate 26. Simultaneously with this first increment of movement, the ball 96 moves up the cam shoulder S' of the opening 92a so that the retainer 48 and the floating cam 72 both move an angular increment indicated at B relative to the drive plate 26 and the cam stop 78, with the lug 74 moving clockwise relative to the screw 106. Accordingly, when the ball 96 is fully seated in the cam slot 102a, the clutch means 90 is fully disengaged and the lug 74 has moved clockwise an angular increment equivalent to that indicated at D, in FIG. 7, relative to the set screw 106 and cam stop 78; this angle being equivalent to the angular increments A and B of the shoulders S and S', while the retainer 48 has moved clockwise an angle equivalent solely to the angle B relative to the drive plate 26 and cam stop 78.

In this position of the various elements, the cam stop 78 is connected by the torsionally strained resilient element 36 to the floating cam 72 through the stub shaft 38, the retainer 48 and the ball 96, while the ball 96 is maintained in the cam slot 102a by its engagement with the groove 95 in the driving plate 26. The resilient element 36 has already been allowed to torsionally unwind an amount equivalent to the angle B as the retainer 48 moved clockwise relative to the drive plate 26, and at this time, the retainer and floating cam 72 move further clockwise relative to the cam stop 78 an angular amount indicated at D'; that is, while the lug 74 moves in a lost motion relationship relative to the cam stop and finally engages the set screw 108, as shown in FIG. 8. During this lost motion relative movement, the resilient element further torsionally unwinds an amount equivalent to the angle D'. Accordingly, while the floating cam has moved clockwise an angular amount equivalent to D plus D' relative to the cam stop 78, the retainer, between which and the cam stop 78 the resilient element was torsionally strained an amount equivalent to D plus D' (the total amount of torsional straining of the resilient element will be explained hereinafter), moves clockwise relative to the cam stop and allows torsional unwinding of the resilient element an amount equivalent to the angles B plus D'. Accordingly, the resilient element is still residually strained an amount equivalent to angle D less the angle B, that is, the angle A.

As shown in FIG. 8, the residual torsional stress in the resilient element 36 urges the retainer 48 clockwise so that the ball 96 is urged against the camming shoulder S of the cam slot 102a so that a component of reaction force acting upon the ball 96 is urging the same to the left and into abutting engagement with the groove 95 of the drive plate 26. With the balls 96 retained in the cam slot 102a, that is, in a clutch disengaged condition, the drive plate 26 is free to move counterclockwise relative to the balance of the coupling means 32 and is not at this time operative to transmit torque to the driven member 24. Upon realignment of the spherical opening 92a with the ball 96, the ball 96 is cammed up the camming shoulder S of the slot 102a and into the opening 92a. During such camming movement, the retainer 48 moves clockwise relative to the floating cam 72 and the cam stop 78 an angular amount equivalent to the angle indicated at A, so that now the retainer has moved clockwise a total angular amount of A plus B plus D', or a total angular amount of D plus D', and the entire torsional strain of the resilient element 36 is relieved. If the level of torque within the uncoupled system is still above the residual torsional stress, the ball 96 will not be seated in the opening 92a but will be immediately forced out of the same and back into the slot 102a.

When the ball 96 was cammed into the spherical opening 92a, the biasing load of the lug 74 on the set screw 108, resulting from the residually stressed resilient element 36 urging the floating cam 72 clockwise, was suddenly released so that the reaction load on the floating cam causes the same to floatingly move counterclockwise to the position shown in FIG. 6, with the lug 74 against the set screw 106. This counterclockwise movement is equivalent to the distance D plus D' so that the distance between the contact of ball 96 on the positioning surface 104a and the cam slot 102a is equivalent to the distance D plus D'. It is now apparent that the limiting torque load is reached when the drive plate 26 has moved a distance equivalent to D plus D' relative to the floating cam 72 and the driven member 24.

Since in a drive line of the type shown at 10, it is desirable that the yokes 12 and 14 remain in their inphase relationship, it is necessary that not just any spherical opening 92 in the drive plate 26 become aligned with any cam slot 102 in the floating cam 72. This is the purpose for providing the spherical openings 92 in the drive plate 26 and the openings 97 in the retainer 48 with four openings of one equal spacing and two openings of another equal spacing. Accordingly, all the balls 96 only become aligned with all the spherical openings 92 once every 180 degrees of rotation, and it is only when all the balls 96 have come into alignment that the retainer 48 may move the final angular amount indicated at A relative to the floating cam 72 so that all the balls 96 may be cammed by the cam slots 102 into the spherical openings 92 and the yokes 12 and 14 remain in an inphase relationship.

It is apparent that when the torque transferring elements in the form of balls 96 of the clutch means 90 are disengaged, so that the balls 96 are in the cam slots 102, the load on the balls is only that equivalent to the residual torsional stress in the resilient element 36 remaining from being strained an amount equal to the angle A, that the disengagement was instantaneous and not gradual, and that the driving member 30 can continue rotating without inducing a torsional load into the balance of the drive line 10.

Figure 9:
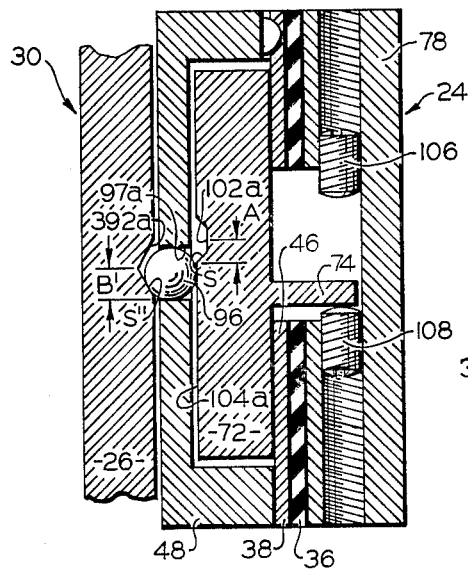
FIGS. 9–11 are diagrammatic views in the nature of a development showing an alternate manner of operating the device shown in FIG. 1.
Figure 10:
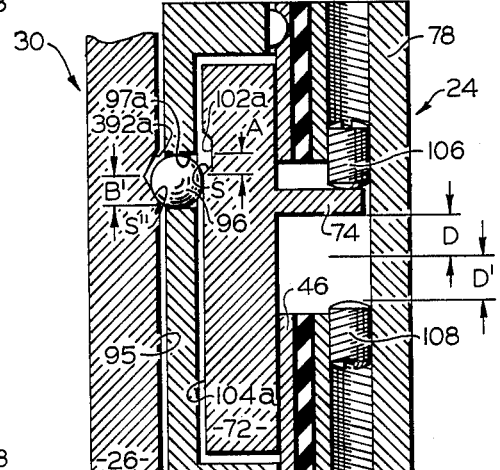
Figure 11:
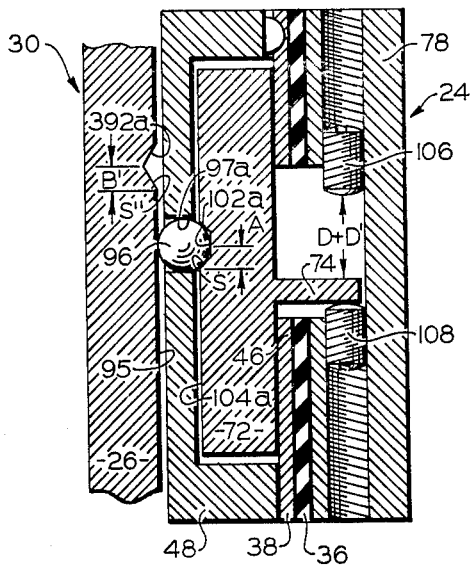

In FIGS. 9, 10, and 11, another manner of operating this invention is shown. In this embodiment, the lug 74 starts in abutment with the set screw 108, the ball 96 is in a conical opening 392a in the drive plate 26 and in the opening 97a in the retainer 48, while the right side of the ball 96 engages the positioning surface 104a of the floating cam 72 immediately below (clockwise of) the cam slot 102a. In this instance, the conical opening 392a is formed with a relatively large cone angle so that in transferring torque to the retainer 48 through the ball 96, a large component of force urges the ball 96 axially to the right and against the floating cam 72, which force urges the latter into a tight pressing relationship with the abutting shoulder 46 of the stub shaft 38 so that the floating cam, the stub shaft, the retainer, and the drive plate rotate unitarily. With the driving member 30 again rotating counterclockwise, and the driven member 24 held stationary, the above unitarily moving members move counterclockwise until the lug 74, which has been moving in a lost motion relationship relative to the cam stop 78, engages the set screw 106 as shown in FIG. 10. This engagement stops rotation of the lug 74 and the floating cam 72 relative to the cam stop 78, and the driven plate 26, retainer 48, and ball 96 move in a lost motion relationship relative to the floating cam 72.

Upon the ball 96 just entering the slot 102a, the floating cam 72 moves clockwise an initial angular amount equivalent to the circumferential length of the camming surface S of the cam slot 102a, indicated at A, while the retainer 48 and the floating cam moves clockwise an initial angular amount equivalent to the circumferential length of the camming surfaces S" of the conical opening 392a, indicated at B'. During this initial movement indicated by B', the retainer 48 has moved relative to the cam stop 78 and the resilient element 36 is torsionally unwound an equivalent amount, while the floating cam 72 and the lug 74 have moved an angular amount equivalent to the angles A plus B' relative to the cam stop 78 and the set screw 106. The retainer 48, ball 96, and floating cam 72 now moved clockwise unitarily the remaining angular distance relative to the cam stop 78, that is, until the lug 74 moves the angular amount indicated at D' and engages the set screw 108; the ball 96 being retained in the cam slot 102a by its engagement with the groove 95 in the driving plate 26, and the resilient element 36 being torsionally unwound an amount equivalent to the angles D' plus B'. The remaining or residual resilient strain of the resilient element 36, equivalent to the angle indicated at A, is retained by the retainer 48 maintaining the ball 96 against the surface S of the cam slot 102a.

When the opening 392a becomes aligned with the ball 96, and the driving torque level has decreased below the residual torsional stress of the resilient element 36, and the yokes 12 and 14 are in an inphase relationship, the ball 96 is cammed into the aligned opening 392a by the action of the cam slot 102a. The retainer 48, during this last described movement, has moved further clockwise an amount equivalent to the angle A, so that all the torsional stress in the resilient element 36 is now relieved. As soon as the ball 96 leaves the cam slot 102a and engages the surface S" of the conical opening 392a, the ball is cammed into pressing engagement with the floating cam 72 biasing the same against the abutting shoulder 46, as seen in FIG. 9.

It is understood that a combination of the operations of FIGS. 6–8 and FIGS. 9–11 may occur, so that in the operation of FIGS. 9–10, if the floating cam is urged counterclockwise by the reaction of the lug 74 on the set screw 108, and the ball 96 engages the floating cam at some distance below (clockwise) the cam slot 102a instead of just slightly below the same, the following will occur; first the floating cam 72 will move unitarily with the drive plate 26 until the lug 74 engages the set screw 106 which stops relative movement between the floating cam and the cam stop, and the drive plate 26, retainer 48, and ball 96 will then move relative to the floating cam 72 until the ball 96 reaches the cam slot 102a. The total relative movement and torsional strain of the resilient element will still be equivalent to the angle D plus D', and the same torsional unwinding of the resilient element 36 will equal the same angle D plus D'. The amount of torsional strain of the resilient element 36, and, therefore, the maximum torque level transferred by the coupling 32 may be controlled by adjusting the set screws 106 and 108 to vary the angle D plus D'. Also, the maximum level can be controlled by the selection of the resilient element 36, since a resilient element which torsionally strains more easily will give a lower maximum torque level, while one which requires a higher load for an equivalent deflection will give a higher maximum torque level.

Figure 12:
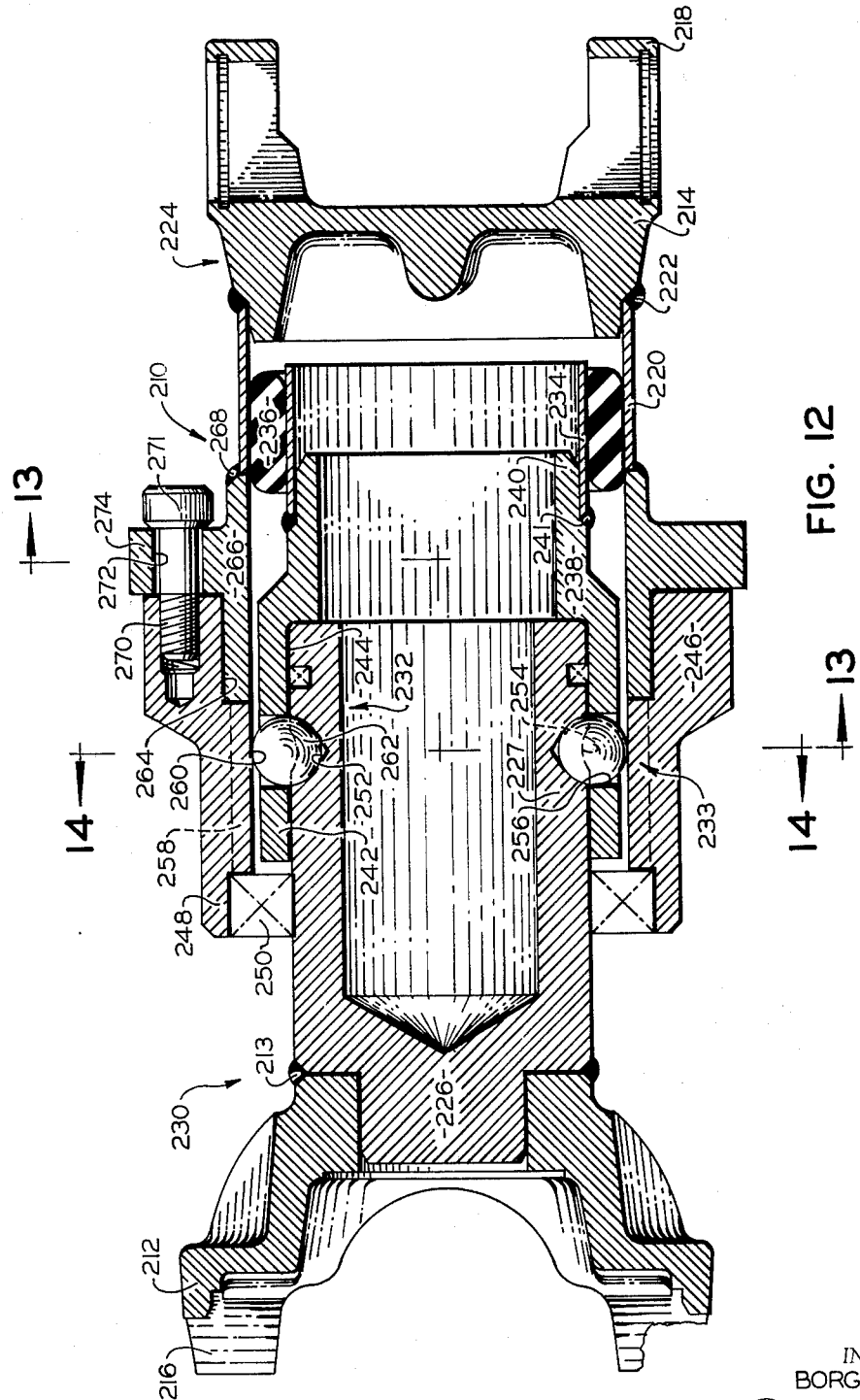
FIG. 12 is a longitudinal sectional view of another embodiment of this invention.
Figure 13:
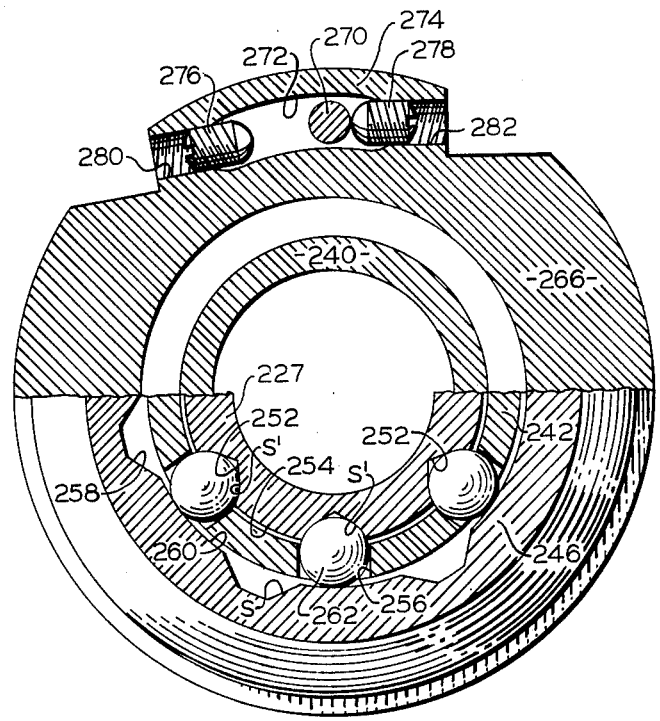
FIG. 13 is a view of the device shown in FIG. 12 taken along the lines 13—13.
Figure 14:
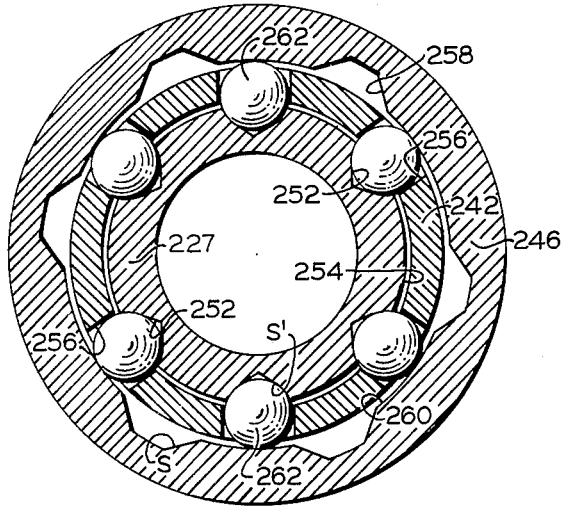
FIG. 14 is a view of the device shown in FIG. 12 taken along the lines 14—14.

Referring now to FIGS. 12–14, wherein another embodiment of the invention is shown, a drive line indicated generally at 210 includes a pair of opposed yoke members 212 and 214 having opposed lugs 216 and 218 respectively and disposed in an inphase, aligned relationship. Either the yoke 212 or the yoke 214 may be the driving end of the drive line 210 and the other the driven end; however, for the purposes of description, the yoke 212 will be considered the driving end and the yoke 214 the driven end.

The yoke 214 has an annular member in the form of a tubular shaft 220 secured thereto as by a weld shown at 222, so that the shaft 220 and the yoke 214 constitute the driven member 224. The yoke 212 is welded at 213 to an annular shaft member 226, the shaft member extending axially from the yoke 212 toward the yoke 214 and constitute the driving member 230.

Coupling means shown generally at 232, including a clutch means 233, are provided to drivingly couple the drive and driven members 230 and 224. More particularly, the coupling means 232 includes a tubular shaft 234 disposed concentrically with and spaced radially inwardly from the shaft 220, and a torsionally acting resilient means in the form of an annular resilient elastomeric element 236 is disposed therebetween and suitably secured to both of the shafts; the usual manner of securement being bonding the element 236 to the inner shaft 234 and compressively surrounding the element with the outer shaft 220. It is understood that, as in the first embodiment of this invention, in this embodiment many other types of torsionally acting resilient means can be utilized in the coupling means 232.

An offset annular shaft 238 has its smaller external diameter portion 240 pressed into the tubular shaft 234 and welded thereto as shown at 241, while extending to the left from the portion 240 is a larger diameter retainer portion 242 which is counterbored at 244 and rotatably receives in the counterbore the right end or drive portion 227 of the annular shaft member 226. The retainer portion 242 is rotatably received in the bore an ananular floating cam member 246; the latter having a lip 248 extending to the left of the retainer portion 242 and interposed between the lip 248 and the shaft 226 is an annular sealing and antifriction ring 250 which seals the opening therebetween while allowing free relative rotation.

The drive portion 227 of the shaft 226, which forms a part of the coupling means 232, is provided with a plurality of spherical camming and engaging openings 252 formed in the periphery thereof. Six such openings 252 have been utilized, with four of them being circumferentially spaced at a first equal angle and the remaining two of them being circumferentially spaced at a second equal angle in a manner similar to that described for the openings 92 in the embodiment of FIGS. 1–5, with the purpose for the unequal spacings being the same; that is, maintaining the inphase relationship of the yokes 212 and 214. A surface 254 of the drive portion 227 intermediate the openings 252 is operative as a ball engaging and positioning surface.

The retainer portion 242 is provided with six ball receiving openings 256 extending radially therethrough, with one opening 256 being adapted to cooperate with each opening 252 when the same are in alignment. Accordingly, there are four openings 256 circumferentially spaced at said first equal angle and the remaining two of them are circumferentially spaced at said second equal angle.

The floating cam 246 is provided with six cam slots 258 formed on the inner surface thereof with one slot 258 being adapted to cooperate with each opening 252 when the same are in alignment. Accordingly, there are four cam slots 258 circumferentially spaced at said first equal angle and the remaining two of them being circumferentially spaced at said second equal angle. The inner surface 260 of the floating cam 246 intermediate the cam slots 258 is operative as a ball engaging and positioning surface.

In the operative position shown in FIGS. 12–14, an opening 256 in the retaining portion 242 is disposed in paired aligned relationship with each opening 252 in the drive portion 227 and a ball 262 is disposed in each pair of openings. The floating cam 246 is positioned relative to the drive portion 227 so that its inner surface 260 is engaging the outer portion of the balls 262 and positioning and maintaining the same in the spherical openings 252; the floating cam being positioned so that each cam slot 258 therein is displaced an equal angular amount in a counterclockwise direction from a spherical opening 252.

The right end of the floating cam member 246 is counter-bored at 264 and an annular cam stop member 266 is rotatably received in the counterbore and extends axially to the right from the floating cam; the right end of the cam stop being secured to the outer tube 220 as by a weld 268 so that the cam stop rotates unitarily with and forms a part of the driven member 224.

Lug means in the form of a bolt 270 is threaded into the floating cam 246 and extends axially to the right therefrom and is received in a circumferentially elongated slot 272 formed in a radially extending flange 274 of the cam stop 266.

A pair of set screws 276 and 278 are threaded into chordal openings 280 and 282 in the cam stop 266, so that the inner ends of the set screws define the circumferential operative limits of the slot 272. The head 271 of the screw 270 projects axially beyond and is larger than the slot 272 and is operative to engage the right side of the flange 274 so that movement to the left of the floating cam 246 is inhibited thereby. In the operative position shown in FIGS. 12–14, the floating cam 246 is displaced clockwise relative to the cam stop 266 so that the bolt 270 is engaging the set screw 278 and the latter is inhibiting or braking further clockwise movement of the bolt 270 and the floating cam 246 relative to the cam stop.

*Operation*

The operation of this embodiment is substantially the same as that of the embodiment shown in FIGS. 1–5 with the device adapted for radial movement of the balls 262 instead of axial movement as shown in the previous embodiment.

Starting with the various structural elements positioned as shown in FIGS. 12–14 and inducing torque into the drive line 210 by holding the driven member 224 stationary and rotating the drive member 230 clockwise when seen from the left, the following sequence of events occurs; the driving member 230 rotates the drive portion 227 clockwise, which in turn drives the retainer 242 and the inner tube 234 clockwise through the balls 262 disposed in the paired openings 252 and 256. The retainer 242 and the tube 234 attempt to drive the driven member 224 clockwise and in so doing torsionally strain the resilient element 236, which is disposed serially with and between the clutch means 233 and the driven member 224, so that relative circumferential movement occurs between the coupling device 232 and the driven member 224.

Since the floating cam 246 is inhibited from moving clockwise relative to the cam stop 266 and the driven member 224, the clutch means 233 including the driving portion 227, retainer 242 and balls 262 move clockwise relative to the floating cam; the balls 262 moving in a lost motion relationship along the surface 260 and relative to the cam slots 258 until the balls 262 reach the camming surface S of the cam slots 258. At that time, the counterclockwise reaction of the retainer 242, which is being urged counterclockwise by the resilient element 236, acting upon the balls 262 urges the same up the cam surface S' of the spherical openings 252 and into the cam slots 258. As the balls 262 move down the cam surfaces S, the floating cam 246 is urged an angular amount counterclockwise relative to the retainer 242, the driving portion 227 and the cam stop 266; the amount being equal to the angular extent of the surface S. Simultaneous with this counterclockwise movement, the retainer 242, the ball 262 and the floating cam 246 move counterclockwise relative to the driving portion 227 and cam stops 266 an angular amount equal to the angular extent of the cam surface S' of the spherical opening 252 as the balls 262 move up the same. This latter movement allows the first increment of torsional counterclockwise unwinding of the resilient element 236.

When the balls 262 completely leave the openings 252, the floating cam 246 and the retainer 242 move unitarily counterclockwise relative to the driving portion 227 and the cam stop 266, the bolt 270 moving in a lost motion relationship in a counterclockwise direction relative to the slot 272, until the bolt 270 moves counterclockwise sufficiently to engage the set screw 276 and inhibit further counterclockwise movement. At this time, the driving portion 227 of the coupling means 232 is completely and instantaneously detached from the remaining portion of the coupling means so that the driving member 230 may freely rotate clockwise relative to the driven member 224.

A certain degree of restoring or residual torsional stress remains in the resilient element 236 at this time, which stress tends to urge the retainer 242 counterclockwise relative to the floating cam 246. This force acts upon the balls 262 in the cam slots 258 and urges the same up the cam surface S; however, they are retained in the slots 258 by the positioning surface 254 of the driving member 227. Upon each clockwise rotation of the driving member 227 relative to the retainer 242 and floating cam 246, the balls 262 become simultaneously aligned with all the openings 252 two times during each rotation and will enter the same if the torque load in the system has fallen below the restoring torsional stress in the resilient element 236 tending to urge the balls 262 out of the cam slot 258. When this occurs, the balls 262 and retainer 242 move counterclockwise relative to the floating cam 246 and the cam stop 266 an angular amount equal to the angular extent of the camming surface S as the balls 262 move up the camming surface S and into the openings 252 in the driving member 227 and all the torsional stress in the resilient element is relieved.

The restoring torsional stress in urging the retainer 242 counterclockwise also urges the floating cam counterclockwise thereby urging the bolt 270 against the set screw 276 so that upon completely relieving the residual torsional stress in the resilient element 236, the release of the reaction load of the bolt 270 on the set screw 276 causes the floating cam 246 to move clockwise until the bolt 270 engages the set screw 278.

Figure 15:
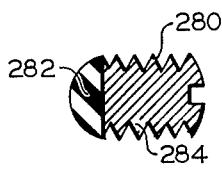
FIG. 15 is an enlarged sectional view of an element of the embodiments shown in FIGS. 1 and 12.

In the embodiment of FIGS. 1–5, operating as described with respect to FIGS. 6–8 and the operation of the embodiment of FIGS. 12–14 as above described, if the controlled torque is set at a low level so that the residual stress in the resilient element 236 is quite low, or if the residual stress is low because the cam surface S of the floating cam member 72 or 246 is of a relatively short circumferential distance, or for any other reason the residual stress is low, the release of the reaction load of the lug 74 on the set screw 108 or the bolt 270 on the set screw 276 may not be sufficient to return the lug 74 to the set screw 106 or the bolt 270 to the set screw 278. In these instances it is desirable to utilize a resilient means to return the lug 74 or bolt 270. An example of such a resilient means is shown in FIG. 15 wherein a set screw 280 is shown having a resilient engaging tip 282 fixedly secured to a body portion 284. The set screw 280 may be utilized in place of the set screw 106 or in place of the set screw 278 so that the resilient tip 282 will be compressed by the lug 74 or bolt 270 and, upon the release of the residual load, the resilient tip 282 will bias the lug 74 or bolt 270 as desired.

The embodiment of this invention shown in FIGS. 12–14 may also be operated similar to the manner of operation shown in FIGS. 9–11 for the embodiment of FIGS. 1–5. This can be accomplished by having the bolts 270 engaging the screw 276 at the start of operation, by increasing the cone angle of the opening 252 in the driving portion 227, and by moving the balls 262 to a position just slightly counterclockwise from the cam slots 258, so that when torque is transmitted to the balls 262, the latter will be cammed outwardly into a securely engaging relationship with the floating cam 246, and the floating cam, the retainer 242, and the driving portion 227 will rotate clockwise unitarily relative to the cam stop 266 until the bolt 270 engages the set screws 278. At this time, the driving member 227, balls 262 and retainer 242 will move unitarily relative to the floating cam 246 until the balls 262 enter the cam slots 258; this relative movement being of a very small amount. The retainer 242 and floating cam 246 will then move counterclockwise unitarily and unwind the resilient element 236 until the bolt 270 engages the set screw 276. Re-engagement of the balls 262 with the driving member 227 will be as previously described; however, because of the increased cone angle of the opening 252, the floating cam 246 does not advance clockwise after the release of the residual loads, but merely moves to the position where the balls 262 engage the positioning surface 260 adjacent the cam slots 258. Additionally, the embodiment of FIGS. 12–14 may operate in a combination of the described methods as previously described with respect to the embodiment of FIGS. 1–5.

While several embodiments of this invention have been shown and described, it is apparent that many changes can be made therein without departing from the scope of this invention as defined in the following claims.

What is claimed is:

1. A first and a second member,
   (a) a coupling means coupling said first and second members in torque transferring relationship,
   (b) said coupling means including a clutch means and a torsionally operative resilient means disposed in a serial relationship,
   (c) said resilient means being operatively positioned between said clutch means and one of said members,
   (d) and clutch disengaging means operatively connected to one of said members upon a predetermined amount of relative rotation between said first and second members and being operative to disengage said resilient means from a portion of said clutch means and engage said resilient means solely to said one member,
   (e) whereby said torque transferring relationship between said members is terminated.

2. A torque overload control device comprising in combination,
   (a) a first and a second torque transferring member,
   (b) a torsionally operative resilient means having a first and a second end and operative to be torsionally strained upon relative rotative movement of said ends in a first direction,
   (c) a clutch means having a first and a second end,
   (d) means connecting said first end of said clutch means to said first member,
   (e) means connecting said first end of said resilient means to said second member,
   (f) means connecting said second end of said resilient means to said second end of said clutch means whereby said first and second members are coupled in a torque transferring relationship,
   (g) and disconnecting means responsive to a predetermined relative rotative movement of said ends of said resilient means in said first direction for disconnecting said second end of said resilient means from said clutch means and connecting said second end of said resilient means to said second member whereby said torque transferring relationship is terminated.

3. A torque overload control device according to claim 2 wherein said second end of said resilient means becomes connected to said second member through said disconnecting means and including lost motion means connecting said disconnecting means to said second member, said lost motion means being operative to allow lost motion movement between said disconnecting means and said second member in a direction opposite to said first direction so that when said torque transferring relationship is terminated said resilient means may torsionally unwind as said disconnecting means moves in a lost motion relationship relative to said second member.

4. A torque overload control device comprising in combination,
   (a) a first member,
   (b) a second member mounted for rotation relative to said first member,
   (c) a coupling means for coupling said first and second members in a torque transferring relationship,
   (d) said coupling means including a torsionally acting resilient means disposed in serial relationship with said members whereby said members are operative to transmit torque therebetween while rotationally deflecting resiliently relative to each other,
   (e) and disconnecting means responsive to the relative rotation of said members for disconnecting said resilient means from said serial relationship upon a predetermined relative rotation of said members.

5. A torque overload control device according to claim 4 wherein a lost motion means connects said disconnecting means to one of said members so that said predetermined relative rotation can occur between said one member and said disconnecting means before the latter is operative to disconnect said resilient means from said serial relationship.

6. A torque overload control device comprising in combination,
   (a) a driving member,
   (b) a driven member disposed coaxially with and rotatable relative to said driving member,
   (c) a coupling means for coupling said members in a torque transferring relationship and including
      (1) a clutch means,
      (2) and a torsionally acting resilient means,
   (d) said clutch means being operatively connected to one of said members,
   (e) said resilient means being serially disposed with said clutch means and having a first end operatively connected to the other of said members and a second end operatively connected to said clutch means whereby said members are coupled in a torque transferring relationship and for resilient deflection relative to each other upon the transmission of torque accompanied by torsional straining of said resilient means,
   (f) and disconnecting means for limiting torsional deflection between said members,
   (g) said disconnecting means being responsive to a predetermined relative deflection of said members to terminate the serial relationship of said clutch means and resilient means thereby terminating the torque transferring relationship of said members.

7. A torque overload control device comprising in combination,
   (a) a first member,
   (b) a second member disposed coaxially with and rotatable relative to said first member,
   (c) a coupling means for coupling said members in a torque transferring relationship and including,
      (1) a clutch member, and
      (2) a torsionally acting resilient means,
   (d) said clutch member being operatively connected to said first member,
   (e) said resilient means being serially disposed with said clutch member and having a first end connected to said second member and a second end operatively connected to said clutch member whereby said coaxial members are coupled in a torque transferring relationship and for resilient deflection relative to each other upon the transmission of torque therebetween accompanied by torsional straining of said resilient means,
   (f) disconnecting means for limiting the torsional deflection between said members,
   (g) a first lost motion means operative to connect said disconnecting means to one of said members upon a predetermined relative rotation of said drive and driven members in a first direction, and
   (h) upon further relative movement between said drive and driven member said disconnecting means disconnecting said second end of said resilient means from said clutch means and connecting the same to said disconnecting means,
   (i) whereby said first and second members may rotate relative to each other.

8. A torque overload control device according to claim 7 including,
   (a) a second lost motion means operative to connect said disconnecting means to said second member upon a predetermined relative rotation in a direction opposite to said first direction whereby said resilient element is torsionally unwound a predetermined amount when the first and second members are rotatable relative to each other.

9. A torque overload control device comprising in combination,
   (a) first and second relatively rotatable and coaxial members,
   (b) a clutch member including a first portion and a second portion with said first portion drivingly connected to said first member,
   (c) a torsionally reacting resilient means having a first end drivingly connected to said second member and a second end drivingly connected to said second portion,
   (d) torque transferring means forming a part of said clutch member and drivingly connecting said first and second portions whereby said members are connected in a torque transferring relationship by said clutch member and said resilient means and rotationally deflect relative to each other by torsionally straining said resilient means,
   (e) disconnecting means for disconnecting said torque transferring means from said first portion upon a predetermined relative rotation of said first and second members and connecting said torque transferring means between said second portion and said second member,
   (f) and lost motion means connecting said disconnecting means to one of said members and operative to allow a predetermined relative movement between said one member and said disengaging means during said predetermined relative rotation between said first and second members,
   (g) said disconnecting means disengaging said torque transferring means from said first portion upon connection of said disengaging means to said one member and relative movement of said first and second members beyond said predetermined relative movement whereby the driving connection between said first and second members is terminated.

10. A torque overload control device comprising in combination,
    (a) first and second relatively rotatable and coaxial members,
    (b) coupling means connecting said members in a torque transferring relationship and including a clutch means connected to said first member and a resilient means serially connecting a portion of said clutch means to said second member whereby said members are operative to transmit torque therebetween accompanied by torsional straining of said resilient means and relative rotative movement of said members,
    (c) clutch disengaging means,
    (d) a first and a second lost motion means of predetermined extent,
    (e) said first lost motion means connecting said clutch disengaging means to said second member and inhibiting said disengaging means from moving in a first direction relative thereto and allowing predetermined lost motion movement of said disconnecting means relative thereto in a second direction,
    (f) said second lost motion means connecting said clutch disengaging means to said clutch means for predetermined lost motion in said first direction and connecting said clutch disengaging means to said portion of said clutch means for unitary rotation in said second direction upon completion of said second lost motion movement.
    (g) said clutch disengaging means disconnecting said clutch means upon relative movement of said members beyond said predetermined second lost motion movement in said first direction during which movement said resilient element is torsionally strained and said clutch disengaging means connects said portion of said clutch means to said clutch disengaging means whereupon said portion and said clutch disengaging means move unitarily relative to said second member in said second direction by means of said first lost motion means during which movement said resilient element is torsionally unwound whereby the torque transferring relationship of said members is terminated and at least a portion of the torsional strain of said resilient element is unwound.

11. A torque overload control device comprising in combination,
(a) first and second relatively rotatable and coaxial members,
(b) coupling means connecting said members in a torque transferring relationship and including a clutch means and a torsionally acting resilient means having a first and a second operative end,
(c) said clutch means including,
(1) a first portion drivingly connected to said first member for unitary rotation,
(2) a second portion connected to said second end of said resilient means, and
(3) a torque transferring portion operatively connecting said first and second portions,
(d) said first end of said resilient means being drivingly connected to said second member,
(e) clutch disconnecting means,
(f) first predetermined lost motion means connecting said clutch disengaging means to said clutch means and maintaining said torque transferring portion connecting said first and second portion during torque transferring between said members and torsional straining of said resilient element in a first rotational direction for allowing said clutch disengaging means to move relative to said clutch means during such torsional straining,
(g) second predetermined lost motion means connecting said clutch disengaging means to said second member and inhibiting said clutch disengaging means from moving in said first direction relative to said second member and allowing lost motion movement in a second direction opposite to said first direction of said clutch disengaging means relative to said second member for cooperating with said first lost motion means and maintaining said torque transferring means in engagement with said first and second portions during relative rotation in said first direction,
(h) upon further relative rotation in said first direction after completion of said first lost motion movement, said clutch diengaging means disengages said torque transferring means from said first portion and connects it to said clutch disengaging means and said clutch disengaging means and said second portion are urged rotatably in said second direction by said resilient means and move in said second direction relative to said second member through the action of said second lost motion connection.

12. A torque overload control device comprising in combination,
(a) a first member,
(b) a second member,
(c) a coupling means connected to said first and second members and mounting the same coaxially in a torque transferring relationship and for resilient relative rotation,
(d) said coupling means including
(1) a clutch means having a first portion drivingly connected to said first member and a second portion,
(2) and a torsionally acting resilient element having a first and a second end with said first end drivingly connected to said second member and said second end drivingly connected to the second portion of said clutch means,
(e) torque transferring means drivingly connecting said first and second portions of said clutch,
(f) clutch disengaging means,
(g) a first lost motion means connecting said clutch disengaging means to said torque transferring means and allowing relative rotation therebetween for a predetermined distance in a first direction accompanied by torsional straining of said resilient element,
(h) a second lost motion means connecting said clutch disengaging means to said second member for maintaining such clutch disengaging means from moving relatively to said second member in said first direction but allowing relative movement therebetween for a predetermined distance in a second direction opposite to said first direction accompanied by torsional unwinding of said resilient element,
(i) said clutch disengaging means being operative to disconnect said torque transferring means from said first clutch portion upon completion of the lost motion movement therebetween while connecting said torque transferring means to said second clutch portion and to said clutch disengaging means,
(j) said torque transferring means and said second clutch portion when connected to said clutch disengaging means being movable unitarily therewith in said second direction relative to said second member for the extent of said second lost motion means.

13. A torque overload control device comprising in combination,
(a) first and second relatively rotatable and coaxial members,
(b) a driving element drivingly connected to said first member for unitary rotation,
(c) a torsionally acting resilient means having a first and a second operative end with said first end drivingly connected to said second member,
(d) a retaining member connected to said second end of said resilient means and disposed juxtaposed said driving element,
(e) said driving element having a plurality of angularly spaced first receiving openings therein,
(f) said retaining member having a plurality of second receiving openings therethrough with one of said second openings being disposed in aligned cooperating relationship with each of said first openings,
(g) a plurality of torque transferring means with one disposed in each of said aligned openings and extending through said second openings,
(h) a floating element juxtaposed said retaining member and disposed on the opposite side thereof with respect to said driving element,
(i) said floating element having an engaging face engaging the extending portion of said torque transferring means and maintaining the same in said aligned openings and having a plurality of cam slots with one displaced at an equal angular distance in a first direction from each of said torque transferring means which cam slots are alignable with and entered by said torque transferring means upon relative rotation of said members said angular distance,
(j) lost motion means of predetermined extent connecting said floating element with said second member for holding said floating element from moving in said first direction relative to said second member and torsionally straining said resilient means as said members rotate relatively in said first direction and for allowing said floating element to move in a direction opposite to said first direction relative to said second member for the extent of said lost motion means and torsionally unwinding said resilient means upon entrance of said torque transferring means into said cam slots.

14. A torque overload control device according to claim 13 wherein,
   (a) said retaining member is disposed axially with respect to said driving element,
   (b) said floating element is disposed on the side of said retaining member axially opposite to said driving element,
   (c) said cam slots extend axially with respect to said engaging face of said floating element,
   (d) said torque transferring means are a plurality of torque transferring elements which move in at least an axial direction upon entering said cam slots.

15. A torque overload control device according to claim 13 wherein,
   (a) said retaining members of angular configuration,
   (b) said driving element and said floating element are disposed on radially opposite sides of said retaining member,
   (c) said engaging face extending circumferentially and said cam slots extend radially with respect to engaging face, and
   (d) said torque transferring means and a plurality of torque transferring elements which move in at least a radial direction upon entering said cam slots.

16. A torque overload control device comprising in combination,
   (a) first and second relatively rotatable and coaxial members,
   (b) coupling means connecting said members in a torque transferring relationship and including a clutch means and a torsionally acting resilient means having a first and a second operative end,
   (c) said clutch means including
      (1) a first portion drivingly connected to said first member for unitary rotation,
      (2) a second portion connected to said second end of said resilient means, and
      (3) a torque transferring portion operatively connecting said first and second portions,
   (d) said first end of said resilient means being drivingly connected to said second member,
   (e) clutch disconnecting means operatively connected to said clutch means for disconnecting said torque transferring portion from said first portion of said clutch means and connecting said torque transferring portion and said second portion of said clutch means to said clutch disconnecting means upon rotary movement of said first portion in a first direction relative to said clutch disconnecting means,
   (f) restraining means including at least said first portion and said torque transferring portion normally maintaining said clutch disconnecting means and said torque transferring portion in a unitary rotatable relationship,
   (g) a double acting lost motion means of predetermined extent connecting said clutch disengaging means to said second member for allowing said clutch disengaging means to move rotatably relative to said second member in said first direction from a first position to a second position and for inhibiting relative movement in said first direction beyond said second position, said first portion when in said second position being movable relative to said clutch disengaging means by overcoming said restraining means and said clutch disengaging means being operable to disconnect said torque transferring portion from said first portion and connect it and said second portion to said clutch disengaging means for disconnecting said members from each other,
   (h) said clutch disengaging means being movable in a second direction opposite to said first direction to said first position from said second position through operation of said lost motion means for allowing said torsionally strained resilient means, said clutch disengaging means, said torque transferring portion and said second portion to move in said second direction for the extent of lost motion means thereby torsionally unwinding said resilient means.

17. A torque overload control device comprising in combination,
   (a) first and second relatively rotatable and coaxial members,
   (b) a driving element drivingly connected to said first member for unitary rotation,
   (c) a torsionally acting resilient means having a first and a second operative end with said first end drivingly connected to said second member,
   (d) a retaining member connected to said second end of said resilient means and disposed juxtaposed said driving element,
   (e) said driving element having a plurality of angularly spaced first receiving openings therein,
   (f) said retaining member having a plurality of second receiving openings therethrough with one of said second openings being disposed in aligned cooperating relationship with each of said first openings,
   (g) a plurality of torque transferring means with one disposed in each of said aligned openings and extending through said second openings,
   (h) a floating element juxtaposed said retaining member and disposed on the opposite side thereof with respect to said driving element,
   (i) said floating element having an engaging face engaging the extending portion of said torque transferring means and maintaining the same in said aligned openings and having a plurality of cam slots with one displaced a slight angular amount in a first direction from each of said torque transferring means,
   (j) restraining means including at least a portion of said driving elements and said torque transferring means normally maintaining said floating element, said torque transferring and said driving element in a unitary rotatable relationship,
   (k) a double acting lost motion means of predetermined extent for allowing said floating element to move rotatably unitarily with said driving element relative to said second member in said first direction from a first position to a second position and for inhibiting further relative movement beyond said second position in said first direction of said floating element relative to said second member, said driving element and said torque transferring means and said retaining member being movable relative to said floating element when the latter is so inhibited for aligning and connecting said cam slots with said torque transferring means and disconnecting said torque transferring means from said driving element whereby said coaxial members are free to rotate relative to each other,
   (l) said floating element being movable in a second direction opposite to said first direction to said first position from said second position through the operation of said lost motion means for allowing said torsionally strained resilient member to torsionally unwind and move said floating element, said torque transferring means and said retaining members in said second direction for the extent of said lost motion means.

References Cited by the Examiner

UNITED STATES PATENTS

| | | | |
|---|---|---|---|
| 979,104 | 12/1910 | Smith | 64—29 |
| 1,322,119 | 11/1919 | Kiwul | 64—29 |
| 2,561,913 | 7/1951 | Dodge | 64—29 |
| 2,775,327 | 12/1956 | Gearhart | 192—56 |
| 2,884,104 | 4/1959 | Brochard | 192—56 |
| 2,983,121 | 5/1961 | Naas | 64—29 |

MILTON KAUFMAN, *Primary Examiner.*

HALL C. COE, *Examiner.*